(12) United States Patent
Liu et al.

(10) Patent No.: US 7,943,216 B2
(45) Date of Patent: May 17, 2011

(54) METHOD TO MAKE SINGLE-LAYER PET BOTTLES WITH HIGH BARRIER AND IMPROVED CLARITY

(75) Inventors: Zhenguo Liu, Flanders, NJ (US); Sanja Mehta, Spartanburg, SC (US); Xiaoyan Huang, Marietta, GA (US); David A Schiraldi, Shaker Heights, OH (US)

(73) Assignee: INVISTA North Americal S.ar.l., Wilmington, DE (US)

( * ) Notice: Subject to any disclaimer, the term of this patent is extended or adjusted under 35 U.S.C. 154(b) by 0 days.

(21) Appl. No.: 12/768,541

(22) Filed: Apr. 27, 2010

(65) Prior Publication Data

US 2010/0209641 A1 Aug. 19, 2010

Related U.S. Application Data

(62) Division of application No. 10/569,614, filed as application No. PCT/US2004/025257 on Aug. 5, 2004.

(60) Provisional application No. 60/498,311, filed on Aug. 26, 2003.

(51) Int. Cl.
- C08K 5/00 (2006.01)
- B32B 27/34 (2006.01)
- B32B 27/08 (2006.01)
- B65D 23/00 (2006.01)
- B65D 23/02 (2006.01)

(52) U.S. Cl. .................. 428/34.1; 428/35.7; 428/36.9; 524/413; 524/435; 524/538; 525/425

(58) Field of Classification Search .................. 525/425; 524/413, 435, 538; 428/34.1, 35.7, 36.9
See application file for complete search history.

(56) References Cited

U.S. PATENT DOCUMENTS

| | | |
|---|---|---|
| 4,187,358 A | 2/1980 | Kyo |
| 4,499,262 A | 2/1985 | Fagerburg |
| 4,501,781 A | 2/1985 | Kushida |
| 4,837,115 A | 6/1989 | Igarashi |
| 4,957,980 A | 9/1990 | Kobayashi |
| 5,021,515 A | 6/1991 | Cochran |
| 5,258,233 A | 11/1993 | Mills |
| 5,266,413 A | 11/1993 | Mills |
| 5,281,360 A | 1/1994 | Hong |
| 5,300,572 A | 4/1994 | Tajima |
| 5,340,884 A | 8/1994 | Mills |
| 5,623,047 A | 4/1997 | Yuo |
| 5,639,815 A | 6/1997 | Cochran |
| 5,650,469 A | 7/1997 | Long |
| 5,866,649 A | 2/1999 | Hong |
| 5,955,527 A * | 9/1999 | Cochran et al. ............... 524/413 |
| 6,083,585 A | 7/2000 | Cahill |
| 6,239,233 B1 | 5/2001 | Bell |
| 6,288,161 B1 | 9/2001 | Kim |
| 6,346,307 B1 | 2/2002 | Al Ghatta |
| 6,346,308 B1 | 2/2002 | Cahill |
| 6,406,766 B1 | 6/2002 | Rotter |
| 6,506,463 B1 | 1/2003 | Cahill |
| 6,509,436 B1 | 1/2003 | Cahill |
| 6,444,283 B1 | 9/2003 | Turner |
| 6,933,055 B2 * | 8/2005 | Share et al. ................ 428/474.4 |
| 2002/0063238 A1 | 5/2002 | Cochran |
| 2003/0134966 A1 | 7/2003 | Kim |
| 2004/0013833 A1 * | 1/2004 | Lee et al. ..................... 428/35.7 |

FOREIGN PATENT DOCUMENTS

| | | |
|---|---|---|
| EP | 0301719 | 2/1989 |
| JP | 02-135259 | 9/1988 |
| JP | 63-288993 | 11/1988 |
| JP | 402135259 A * | 5/1990 |
| JP | 2663578 | 10/1997 |
| WO | WO 01/090238 | 11/2001 |

OTHER PUBLICATIONS

Mitsubishi Gas Chemical Company, Inc., Nylon-MXD6, Superior Performance in Barrier Packaging; website—www.mgc-a.com/Pages/MXD6/media/Mxd6brAr.pdf.

* cited by examiner

Primary Examiner — Ana L Woodward
(74) Attorney, Agent, or Firm — Craig M. Sterner

(57) ABSTRACT

The present invention comprises a blend of polyester and a partially aromatic polyamide with an ionic compatibilizer and a cobalt salt. This blend can be processed into a container that has both active and passive oxygen barrier and carbon dioxide barrier properties at an improved color and clarity than containers known in the art. The partially aromatic polyamide is preferably meta-xylylene adipamide. The ionic compatibilizer is preferably 5-sodiumsulfoisophthalic acid or 5-zincsulfoisophthalic acid, or their dialkyl esters such as the dimethyl ester (SIM) and glycol ester (SIPEG). The cobalt salt is selected form the class of cobalt acetate, cobalt carbonate, cobalt chloride, cobalt hydroxide, cobalt naphthenate, cobalt oleate, cobalt linoleate, cobalt octoate, cobalt stearate, cobalt nitrate, cobalt phosphate, cobalt sulfate, cobalt (ethylene glycolate), or mixtures of two or more of these. The partially aromatic polyamide is present in a range from about 1 to about 10 wt. % of said composition. The ionic compatibilizer is present in a range from about 0.1 to about 2.0 mol-% of said composition. The cobalt salt is present in a range from about 20 to about 500 ppm of said composition.

15 Claims, 2 Drawing Sheets

METHOD TO MAKE SINGLE-LAYER PET BOTTLES WITH HIGH BARRIER AND IMPROVED CLARITY

CROSS REFERENCE TO RELATED APPLICATION

This application is a division of U.S. patent application Ser. No. 10/569,614 filed Feb. 24, 2006; which is a 371 of PCT/US04/25257 filed Aug. 5, 2004; which claims benefit of priority from U.S. Provisional Application Ser. No. 60/498,311 filed Aug. 26, 2003.

BACKGROUND OF THE INVENTION

1) Field of the Invention

The invention relates to compatibilized blends of polyamides in polyesters, a method for forming such compositions, and to containers made from such compositions. Specifically the compositions have less yellowness than previous blends. The blends can be used as passive gas barriers, or active oxygen scavengers with the addition of a transition metal catalyst.

2) Prior Art

Plastic materials have been replacing glass and metal packaging materials due to their lighter weight, decreased breakage compared to glass, and potentially lower cost. One major deficiency with polyesters is its relatively high gas permeability. This restricts the shelf life of carbonated soft drinks and oxygen sensitive materials such as beer and fruit juices.

Multilayer bottles containing a low gas permeable polymer as an inner layer, with polyesters as the other layers, have been commercialized. Blends of these low gas permeable polymers into polyester have not been successful due to haze formed by the domains in the two-phase system. The preferred polyamide is a partially aromatic polyamide containing meta-xylylene groups, especially poly (m-xylylene adipamide), MXD6.

The MXD6 bulletin (TR No. 0009-E) from Mitsubishi Gas Chemical Company, Inc., Tokyo Japan, clearly shows that the haze of a multilayer bottle containing a layer of 5 wt-% MXD6 is ~1% compared to 15% for a blend of the same 5 wt-%.

However, the use of partially aromatic polyamides as the low gas permeable polymer gives an increase in the yellowness of the resultant container.

U.S. Pat. No. 4,501,781 to Kushida et al. discloses a hollow blow-molded biaxially oriented bottle shaped container comprising a mixture of polyethylene terephthalate (PET) resin and a xylylene group-containing polyamide resin. Both monolayer and multilayer containers are disclosed, but there is no information on the color of the bottles.

U.S. Pat. No. 5,650,469 to Long et al. discloses the use of a terephthalic acid based polyester blended with low levels (0.05 to 2.0 wt-%) of a polyamide to reduce the acetaldehyde level of the container. These blends produced lower yellowness containers than a corresponding blend made from a dimethyl terephthalate based polyester, but are still unsatisfactory for the higher levels required to significantly lower (decrease) the gas permeability.

U.S. Pat. Nos. 5,258,233, 5,266,413 and 5,340,884 to Mills et al. discloses a polyester composition comprising 0.05 to 2.0 wt-% of low molecular weight polyamide. At a 0.5 wt-% blend of MXD6 the haze of the bottle increased from 0.7 to 1.2%. No gas permeation or color data is given.

U.S. Pat. No. 4,837,115 to Igarashi et al. discloses a blend of amino terminated polyamides with PET to reduce acetaldehyde levels. There was no increase in haze with the addition of 0.5 wt-% MXD6, but at 2 wt-% the haze increased from 1.7 to 2.4%. No gas permeation or color data is given.

U.S. Pat. No. 6,239,233 to Bell et al. discloses a blend of acid terminated polyamides with PET that has reduced yellowness compared to amino terminated polyamides. No gas permeation data is given.

U.S. Pat. No. 6,346,307 to Al Ghatta et al. discloses the use of a dianhydride of a tetracarboxylic acid to reduce the dispersed domain size of a blend of MXD6 in PET. The examples did not give color data, but at a 10 wt-% MXD6 blend level the oxygen permeability was reduced from 0.53 to 0.12 ml/bottle/day/atm and the carbon dioxide permeability was reduced from 18.2 to 7.02 ml/bottle/day/atm.

U.S. Pat. No. 6,444,283 to Turner et al. discloses that low molecular weight MXD6 polyamides have lower haze than higher molecular weight MXD6 when blended with PET. The examples did not give color data, but at a 2 wt-% MXD6 (Mitsubishi Chemical Company grade 6007) the oxygen permeability of an oriented film was reduced from 8.1 to 5.7 cc-mil/100 $in^2$-atm-day compared to 6.1 for the low molecular weight MXD6.

U.S. Pat. No. 4,957,980 to Koyayashi et al. discloses the use of maleic anhydride grafted copolyesters to compatibilize polyester-MXD6 blends.

U.S. Pat. No. 4,499,262 to Fagerburg et al. discloses sulfo-modified polyesters that give an improved rate of acetaldehyde generation and a lower critical planar stretch ratio. Blends with polyamides were not discussed.

Japanese Pat. No. 2663578 B2 to Katsumasa et al. discloses the use of 0.5 to 10 mole % 5-sulfoisophthalte copolymers as compatibilizer of polyester-MXD6 blends. No color data was given.

The use of a transition metal catalyst to promote oxygen scavenging in polyamide multilayer containers, and blends with PET, has been disclosed in the following patents, for example.

U.S. Pat. Nos. 5,021,515, 5,639,815 and 5,955,527 to Cochran et al. disclose the use of a cobalt salt as the preferred transition metal catalyst and MXD6 as the preferred polyamide. There is no data on the color or haze of the polyamide blends.

U.S. Pat. Nos. 5,281,360 and 5,866,649 to Hong, and U.S. Pat. No. 6,288,161 to Kim discloses blends of MXD6 with PET and a cobalt salt catalyst. There is no data on the color or haze of the polyamide blends.

U.S. Pat. No. 5,623,047 to You et al. discloses the use of a catalyst composition containing an alkali metal acetate, preferably 30 ppm cobalt acetate to mask the yellowness in polyesters polymerized from terephthalic acid.

US Pat. Application 2003/0134966 A1 to Kim et al. discloses the use of cobalt octoate and xylene group-containing polyamides for use in multi-layer extrusion blow-molding for improved clarity. Extrusion blow-molding minimizes the orientation of the polyamide domain size compared to injection stretch blow molding containers. No color data is given.

There is a need for an improved gas barrier polyester composition that can be injection stretch blow molded as a monolayer container that has reduced yellowness and adequate haze. This is particularly required for containers that require a long shelf life, such as beer and other oxygen sensitive materials. None of these patents disclose how this balance of properties can be achieved.

SUMMARY OF THE INVENTION

The present invention is an improvement over polyester/polyamide blends known in the art in that these compositions have reduced yellowness.

In the broadest sense the present invention comprises a compatibilized blend of polyester and a partially aromatic polyamide with an ionic compatibilizer and a cobalt salt.

The broadest scope of the present invention also comprises a container that has both active and passive oxygen barrier and carbon dioxide barrier properties at an improved color and clarity than containers known in the art.

In the broadest sense the present invention also comprises a container in which the balance of gas barrier properties and color can be independently balanced.

In the broadest sense the present invention is a method to blend polyester and polyamides with an ionic compatibilizer and a cobalt salt.

The drawing is to aid those skilled in the art in understanding the invention and is not meant to limit the scope of the invention in any manner beyond the scope of the claims.

DETAILED DESCRIPTION OF THE INVENTION

Figure 1:
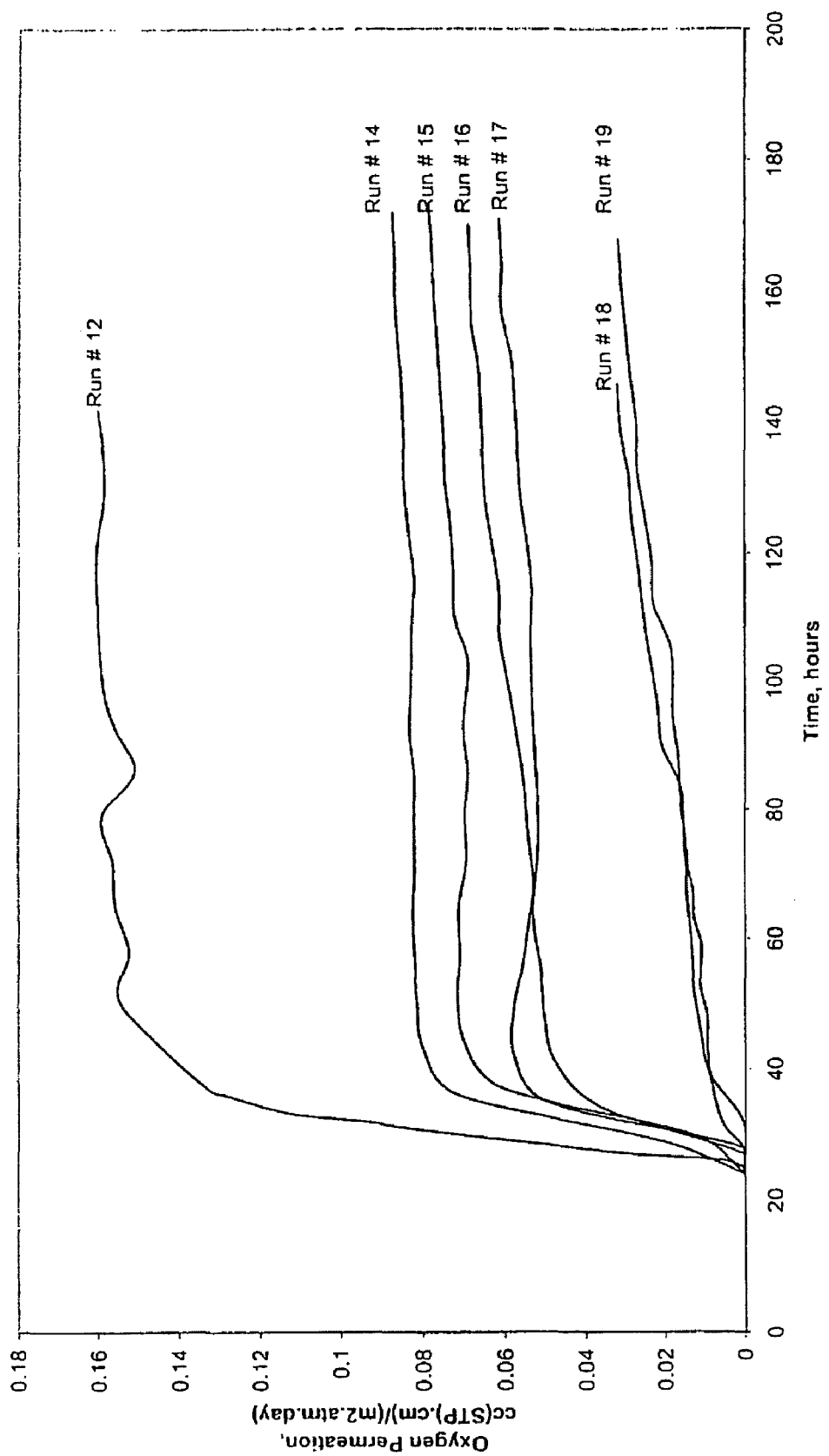
FIG. 1 shows a graph of the oxygen permeation rate of selected runs of Example 3.

Compositions of the present invention comprise: polyester, partially aromatic polyamide, ionic compatibilizer, and a cobalt salt.

Generally polyesters can be prepared by one of two processes, namely: (1) the ester process and (2) the acid process. The ester process is where a dicarboxylic ester (such as dimethyl terephthalate) is reacted with ethylene glycol or other diol in an ester interchange reaction. Because the reaction is reversible, it is generally necessary to remove the alcohol (methanol when dimethyl terephthalate is employed) to completely convert the raw materials into monomers. Certain catalysts are well known for use in the ester interchange reaction. In the past, catalytic activity was then sequestered by introducing a phosphorus compound, for example polyphosphoric acid, at the end of the ester interchange reaction. Primarily the ester interchange catalyst was sequestered to prevent yellowness from occurring in the polymer.

Then the monomer undergoes polycondensation and the catalyst employed in this reaction is generally an antimony, germanium or titanium compound, or a mixture of these.

In the second method for making polyester, an acid (such as terephthalic acid) is reacted with a diol (such as ethylene glycol) by a direct esterification reaction producing monomer and water. This reaction is also reversible like the ester process and thus to drive the reaction to completion one must remove the water. The direct esterification step does not require a catalyst. The monomer then undergoes polycondensation to form polyester just as in the ester process, and the catalyst and conditions employed are generally the same as those for the ester process.

For most container applications this melt phase polyester is further polymerized to a higher molecular weight by a solid state polymerization.

In summary, in the ester process there are two steps, namely: (1) an ester interchange, and (2) polycondensation. In the acid process there are also two steps, namely: (1) direct esterification, and (2) polycondensation.

Suitable polyesters are produced from the reaction of a diacid or diester component comprising at least 65 mol-% terephthalic acid or $C_1$-$C_4$ dialkylterephthalate, preferably at least 70 mol-%, more preferably at least 75 mol-%, even more preferably, at least 95 mol-%, and a diol component comprising at least 65% mol-% ethylene glycol, preferably at least 70 mol-%, more preferably at least 75 mol-%, even more preferably at least 95 mol-%. It is also preferable that the diacid component is terephthalic acid and the diol component is ethylene glycol, thereby forming polyethylene terephthalate (PET). The mole percent for all the diacid component totals 100 mol-%, and the mole percentage for all the diol component totals 100 mol-%.

Where the polyester components are modified by one or more diol components other than ethylene glycol, suitable diol components of the described polyester may be selected from 1,4-cyclohexandedimethanol, 1,2-propanediol, 1,4-butanediol, 2,2-dimethyl-1,3-propanediol, 2-methyl-1,3-propanediol (2MPDO) 1,6-hexanediol, 1,2-cyclohexanediol, 1,4-cyclohexanediol, 1,2-cyclohexanedimethanol, 1,3-cyclohexanedimethanol, and diols containing one or more oxygen atoms in the chain, e.g., diethylene glycol, triethylene glycol, dipropylene glycol, tripropylene glycol or mixtures of these, and the like. In general, these diols contain 2 to 18, preferably 2 to 8 carbon atoms. Cycloaliphatic diols can be employed in their cis or trans configuration or as mixture of both forms. Preferred modifying diol components are 1,4-cyclohexanedimethanol or diethylene glycol, or a mixture of these.

Where the polyester components are modified by one or more acid components other than terephthalic acid, the suitable acid components (aliphatic, alicyclic, or aromatic dicarboxylic acids) of the linear polyester may be selected, for example, from isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid, bibenzoic acid, or mixtures of these and the like. In the polymer preparation, it is often preferable to use a functional acid derivative thereof such as the dimethyl, diethyl, or dipropyl ester of the dicarboxylic acid. The anhydrides or acid halides of these acids also may be employed where practical. These acid modifiers generally retard the crystallization rate compared to terephthalic acid.

Also particularly contemplated by the present invention is a modified polyester made by reacting at least 85 mol-% terephthalate from either terephthalic acid or dimethylterephthalate with any of the above comonomers.

In addition to polyester made from terephthalic acid (or dimethyl terephthalate) and ethylene glycol, or a modified polyester as stated above, the present invention also includes the use of 100% of an aromatic diacid such as 2,6-naphthalene dicarboxylic acid or bibenzoic acid, or their diesters, and a modified polyester made by reacting at least 85 mol-% of the dicarboxylate from these aromatic diacids/diesters with any of the above comonomers.

Preferably the polyamide used as the gas barrier component of the blend is selected from the group of partially aromatic polyamides is which the amide linkage contains at least one aromatic ring and a non-aromatic species. Preferred partially aromatic polyamides include: poly(m-xylylene adipamide); poly(hexamethylene isophthalamide); poly(hexamethylene adipamide-co-isophthalamide); poly(hexamethylene adipamide-co-terephthalamide); poly(hexamethylene isophthalamide-co-terephthalamide); or mixtures of two or more of these. The most preferred is poly(m-xylylene adipamide).

The preferred range of polyamide is 1 to 10% by weight of the composition depending on the required gas barrier required for the container.

The ionic compatibilizer is preferably a copolyester containing a metal sulfonate salt group. The metal ion of the sulfonate salt may be Na+, Li+, K+, Zn++, Mn++, Ca++ and the like. The sulfonate salt group is attached to an aromatic acid nucleus such as a benzene, naphthalene, diphenyl, oxydiphenyl, sulfonyldiphenyl, or methylenediphenyl nucleus.

Preferably, the aromatic acid nucleus is sulfophthalic acid, sulfoterephthalic acid, sulfoisophthalic acid, 4-sulfonaphthalene-2,7-dicarboxylic acid, and their esters. Most preferably, the sulfomonomer is 5-sodiumsulfoisophthalic acid or 5-zincsulfoisophthalic acid and most preferably their dialkyl esters such as the dimethyl ester (SIM) and glycol ester (SIPEG). The preferred range of 5-sodiumsulfoisophthalic or 5-zincsulfoisophthalic acid to reduce the haze of the container is 0.1 to 2.0 mol-%.

Suitable cobalt compounds for use with the present invention include cobalt acetate, cobalt carbonate, cobalt chloride, cobalt hydroxide, cobalt naphthenate, cobalt oleate, cobalt linoleate, cobalt octoate, cobalt stearate, cobalt nitrate, cobalt phosphate, cobalt sulfate, cobalt (ethylene glycolate), and mixtures of two or more of these, among others. As a transition metal catalyst for active oxygen scavenging, a salt of a long chain fatty acid is preferred, cobalt octoate or stearate being the most preferred. For color control of passive gas barrier blends any cobalt compound can be used, with cobalt acetate being preferred.

It has surprisingly been found that the ionic compatibilizer, in addition to improving gas barrier properties and improving haze, in combination with a cobalt salt significantly reduces the yellowness of the resin, preform and container. The preferred range of Co for blends containing 1 to 10 wt-% partially aromatic polyamide and 0.1 to 2.0 mol-% of an ionic compatibilizer is 20 to 500 ppm.

Although not required, additives may be used in the polyester/polyamide blend. Conventional known additives include, but are not limited to an additive of a dye, pigment, filler, branching agent, reheat agent, anti-blocking agent, antioxidant, anti-static agent, biocide, blowing agent, coupling agent, flame retardant, heat stabilizer, impact modifier, UV and visible light stabilizer, crystallization aid, lubricant, plasticizer, processing aid, acetaldehyde and other scavengers, and slip agent, or a mixture thereof.

The blend of polyester, ionic compatibilizer, cobalt salt and partially aromatic polyamide is conveniently prepared by adding the components are the throat of the injection molding machine that produces a preform that can be stretch blow molded into the shape of the container. If a conventional polyester base resin designed for polyester containers is used, then one method is to prepare a master batch of a polyester containing the ionic compatibilizer, and optionally a transition metal catalyst for active scavenging, together with the partially aromatic polyamide using a gravimetric feeder for the three components. Alternatively the polyester resin can be polymerized with the ionic compatibilizer, and optionally a transition metal catalyst for active scavenging, to form a copolymer. This copolymer can be mixed at the injection molding machine with the partially aromatic nylon. Alternative all the blend components can be blended together, or as a blend of master batches, and fed as a single material to the extruder. The mixing section of the extruder should be of a design to produce a homogeneous blend. This can be determined by measuring the thermal properties of the preform and observing a single glass transition temperature in contrast to two separate glass transition temperatures of the partially aromatic polyamide and polyester.

These process steps work well for forming carbonated soft drink, water or beer bottles, and containers for hot fill applications, for example. The present invention can be employed in any of the conventional known processes for producing a polyester container.

Testing Procedures

1. Oxygen and Carbon Dioxide Permeability of Films, Passive

Oxygen flux of film samples, at zero percent relative humidity, at one atmosphere pressure, and at 25° C. was measured with a Mocon Ox-Tran model 2/20 (MOCON Minneapolis, Minn.). A mixture of 98% nitrogen with 2% hydrogen was used as the carrier gas, and 100% oxygen was used as the test gas. Prior to testing, specimens were conditioned in nitrogen inside the unit for a minimum of twenty-four hours to remove traces of atmospheric oxygen dissolved in the PET matrix. The conditioning was continued until a steady base line was obtained where the oxygen flux changed by less than one percent for a thirty-minute cycle. Subsequently, oxygen was introduced to the test cell. The test ended when the flux reached a steady state where the oxygen flux changed by less than 1% during a 30 minute test cycle. Calculation of the oxygen permeability was done according to a literature method for permeation coefficients for PET copolymers, from Fick's second law of diffusion with appropriate boundary conditions. The literature documents are: Sekelik et al., *Journal of Polymer Science Part B: Polymer Physics*, 1999, Volume 37, Pages 847-857. The second literature document is Qureshi et al., *Journal of Polymer Science Part B: Polymer Physics*, 2000, Volume 38, Pages 1679-1686. The third literature document is Polyakova, et al., *Journal of Polymer Science Part B: Polymer Physics*, 2001, Volume 39, Pages 1889-1899.

The carbon dioxide permeability of films was measured in the same manner, replacing the oxygen gas with carbon dioxide and using the Mocon Permatran-C 4/40 instrument.

All film permeability values are reported in units of (cc (STP)·cm)/($m^2$·atm·day)).

2. Oxygen Permeability of Films, Active Scavenger.

The same method was used as for passive oxygen permeability above with the exception that the oxygen flux did not necessarily equilibrate to a steady state. After the introduction of the oxygen into the cell, the reduction in the amount of oxygen was measured from 0 to at least 350 hours. Treatment of the data generated an Apparent Permeation Coefficient (APC), as a function of time with oxygen exposure (cc(STP) ·cm)/($m^2$·atm·day). The generated APC data is not a steady state value in normal permeation coefficients. APC is data generated that describes oxygen permeation at a fixed point in time, even though this coefficient is changing slowly with time. These changes are too small to be detected during the time necessary for measuring their value at any fixed point in time. Calculation of the APC was done according to a literature method for permeation coefficients for PET copolymers, from Fick's second law of diffusion with appropriate boundary conditions, in the same manner as described for passive barrier permeability.

3. Carbon Dioxide Permeability of Bottles.

Carbon dioxide permeability of bottles was measured using a MOCON Permatran C-200 $CO_2$ Permeation System. Tests were conducted at 22° C. The bottles were purged with nitrogen and then pressurized with $CO_2$ at a pressure of 60 psi (4.01 MPa). The bottles were left in ambient conditions for 3 days and the pressure measured. Bottles in which the pressure had dropped below 56 psi (3.75 Mpa) were rejected, otherwise the bottles were repressurized to 60 psi (4.01 MPa) and placed in the testing chamber, which has been purged with nitrogen for at least 5 hours. After a day, measurements of the $CO_2$ in the test chamber were taken over a 30 minute time frame, over an eight hour time period. The nitrogen flow rate to the sensor was 100 $cm^3$/min, and to the carrier stream was 460 $cm^3$/min. Results are reported as $cm^3$/bottle/day.

4. Intrinsic Viscosity (IV)

Intrinsic viscosity (IV) is determined by dissolving 0.2 grams of an amorphous polymer composition in 20 milliliters of dichloroacetic acid at a temperature of 25° C. and using an Ubbelhode viscometer to determine the relative viscosity (RV). RV is converted to IV using the equation: IV=[(RV−1)×0.691]+0.063.

5. Color

The haze of the preform and bottle walls was measured with a Hunter Lab ColorQuest II instrument. D65 illuminant was used with a CIE 1964 10° standard observer. The haze is defined as the percent of the CIE Y diffuse transmittance to the CIE Y total transmission. The color of the preform and bottle walls was measured with the same instrument and is reported using the CIELAB color scale, L* is a measure of brightness, a* is a measure of redness (+) or greenness (−) and b* is a measure of yellowness (+) or blueness (−).

6. Diethylene Glycol (DEG)

The DEG (diethylene glycol) content of the polymer is determined by hydrolyzing the polymer with an aqueous solution of ammonium hydroxide in a sealed reaction vessel at 220±5° C. for approximately two hours. The liquid portion of the The DEG (diethylene glycol) content of the polymer is determined by hydrolyzing the polymer with an aqueous solution of ammonium hydroxide in a sealed reaction vessel at 220±5° C. for approximately two hours. The liquid portion of the hydrolyzed product is then analyzed by gas chromatography. The gas chromatography apparatus is a FID Detector (HP5890, HP7673A) from Hewlett Packard. The ammonium hydroxide is 2.8 to 30% by weight ammonium hydroxide from Fisher Scientific and is reagent grade.

7. Isophthalic and Naphthalene Dicarboxylic Acid

The percent isophthalic acid and naphthalene dicarboxylic acid present in the amorphous polymer was determined at 285 nanometers using a Hewlett Packard Liquid Chromatograph (HPLC) with an ultraviolet detector. An amorphous polymer sample was hydrolyzed in diluted sulfuric acid (10 ml acid in 1 liter deionized water) in a stainless steel bomb at 230° C. for 3 hours. After cooling, an aqueous solution from the bomb was mixed with three volumes of methanol (HPLC grade) and an internal standard solution. The mixed solution was introduced into the HPLC for analysis.

8. Metal Content

The metal content of the ground polymer samples was measured with an Atom Scan 16 ICP Emission Spectrograph. The sample was dissolved by heating in ethanolamine, and on cooling, distilled water was added to crystallize out the terephthalic acid. The solution was centrifuged, and the supernatant liquid analyzed. Comparison of atomic emissions from the samples under analysis with those of solutions of known metal ion concentrations was used to determine the experimental values of metals retained in the polymer samples.

9. Preform and Bottle Process

After solid state polymerization, the resin of the present invention is typically, dried for 4-6 hours at 170-180° C., melted and extruded into preforms. Each preform for a 0.59 liter soft drink bottle, for example, employs about 24 grams of the resin. The preform is then heated to about 100-120° C. and blown-molded into a 0.59 liter contour diameter giving a stretch ratio of twelve (2×6). Since the bottle size is fixed, different preform sizes can be used for obtaining different stretch ratios.

10. Scanning Electron Micrograph

Films were prepared by compression molding by heating at 275° C. in a press for 3 minutes without pressure, then the pressure was cycled several times between 0 and 300 psi and then held at 300 psi for 4 minutes. The film was quenched in ice water. These films were notched with a razor blade on the film surface to facilitate a brittle failure, immersed in liquid nitrogen for 15 minutes, removed and fractured by hand perpendicular to the thickness direction. Fracture surfaces were coated with 100 angstrom of gold and were observed using a JEOL 840A scanning electron microscope.

The following examples are given to illustrate the present invention, and it shall be understood that these examples are for the purposes of illustration and are not intended to limit the scope of the invention.

EXAMPLES

Various polyester (PET) resins reflecting typical commercial recipes were produced. Comonomers included isophthalic acid (or its dimethyl ester) (IPA) and diethylene glycol (DEG) as crystallization retardants and naphthalene dicarboxylic acid (or its dimethyl ester) (NDC) to improve the temperature at which a container can be filled.

Amorphous polyester was first produced with an IV of about 0.6, this was then solid phase polymerized to the final resin IV. The additives used were, manganese acetate, zinc acetate, cobalt acetate, antimony trioxide and poly-phosphoric acid. The analyses of these resins are set forth in Table 1.

TABLE 1

| | Resin Identification | | | |
|---|---|---|---|---|
| | A | B | C | D |
| Process | TA | DMT | DMT | DMT |
| IV | 0.83 | 0.82 | 0.84 | 0.81 |
| IPA, wt-% | 2.5 | 3.1 | 0 | 0 |
| NDC, wt-% | 0 | 0 | 5 | 5 |
| DEG, wt-% | 1.5 | 0.7 | 0.6 | 0.6 |
| Cobalt, ppm | 30 | 40 | 100 | 0 |

A series of copolyesters were made containing various amounts of 5-sulfoisophthalic acid (SIPA), either the ester or the gylcolate of SIPA was used. The melt phase polymerization was conducted in the normal way, but the amorphous resin was not solid state polymerized for resin S3. In the case of Resin S1, zinc acetate was used in place of manganese acetate as the ester-interchange catalyst. The analyses of these resins are set forth in Table 2.

TABLE 2

| | Resin Identification | | |
|---|---|---|---|
| | S1 | S2 | S3 |
| Process | DMT | DMT | DMT |
| IV | 0.84 | 0.82 | 0.56 |
| SIPA, mol-% | 0.11 | 1.3 | 1.7 |
| Cobalt, ppm | 0 | 0 | 40 |

A master batch of the cobalt salt to be used as the transition metal catalyst for active oxygen scavenging was made by late addition of 2 wt-% cobalt octoate to a polyester prepared using 75 ppm Zn (as zinc acetate), 250 ppm Sb (as antimony trioxide, 60 ppm P (as poly-phosphoric acid) and 2.5 wt-% IPA. This material had an IV of 0.35-0.40.

60 ppm P (as poly-phosphoric acid) and 2.5 wt-% IPA. This material had an IV of 0.35-0.40.

Unless otherwise stated the partially aromatic nylon used in the blend was Type 6007 from Mitsubishi Gas Chemical, Tokyo Japan. Type 6007 has a number average molecular weight of 25, 900 and its melt viscosity at 271° C. and 1000 sec$^{-1}$ is 280 Pa·s.

Unless otherwise stated the preforms were prepared on an Arburg injection molding machine using 24 g of material, and blown into a 0.59 liter contour bottle on a Sidel SBO2 stretch blow molding machine. The bottle sidewall thickness is about 0.25 mm.

Example 1

The effect of the interaction of SIPA with Co on the yellowness of preforms and bottles was studied by blending either polyester resin D or S1 with the cobalt master batch and MXD6. The yellowness value (b*) of the preforms and bottle sidewalls are set forth in Table 3 (lower or negative b* values correspond to less yellowness).

TABLE 3

| Run No. | Resin | Co, ppm | MXD6, wt-% | SIPA, mol-% | Preform b* | Delta[1] | Bottle b* | Delta[2] |
|---|---|---|---|---|---|---|---|---|
| 1 | D | 0 | 0 | 0 | 11 | Control | 3.6 | Control |
| 2 | D | 0 | 5 | 0 | 19.3 | 8.3 | 7.1 | 3.5 |
| 3 | D | 100 | 0 | 0 | 0.7 | −10.3 | 1 | −2.6 |
| 4 | D | 200 | 5 | 0 | 4.2 | −6.8 | 3.5 | −0.1 |
| 5 | S1 | 0 | 0 | 0.11 | 16.3 | Control | 4.6 | Control |
| 6 | S1 | 0 | 5 | 0.11 | 17.5 | 1.2 | 5.5 | 0.9 |
| 7 | S1 | 100 | 0 | 0.11 | −0.8 | −17.1 | 1.1 | −3.5 |
| 8 | S1 | 200 | 5 | 0.11 | −6.6 | −22.9 | 2 | −2.6 |

[1]Difference in b* of the preform compared to the control.
[2]Difference in b* of the bottle compared to the control.

0.11 mol-% SIPA, there is a synergistic effect and the Co salt is markedly more effective in offsetting the yellowness.

Example 2

A similar trial was conducted using resin C as the control and the results set forth in Table 4.

TABLE 4

| Run No. | Resin | Co, ppm | MXD6, wt-% | SIPA, mol-% | Preform b* | Bottle b* |
|---|---|---|---|---|---|---|
| 9 | C | 100 | 0 | 0 | −0.1 | 1.2 |
| 10 | C | 200 | 5 | 0 | 3.6 | 5.7 |
| 11 | S1 | 200 | 5 | 0.11 | −3.5 | 3.6 |

The haze of these preforms and bottle sidewalls are set forth in Table 5.

TABLE 5

| Run No. | Resin | Co, ppm | MXD6, wt-% | SIPA, mol-% | Preform haze, % | Bottle haze, % |
|---|---|---|---|---|---|---|
| 9 | C | 100 | 0 | 0 | 9.5 | 1.3 |
| 10 | C | 200 | 5 | 0 | 16.4 | 13.9 |
| 11 | S1 | 200 | 5 | 0.11 | 14.3 | 8.2 |

The results again show the synergistic effect of the ionic compatibilizer on the cobalt salt as a means to reduce yellowness, in addition the ionic compatibilizer reduced the haze of the bottle sidewall containing 5 wt-% MXD6.

Example 3

Another trial was conducted in which the amount of MXD6 was varied at a constant SIPA level of 0.11 mol-%, and the results set forth in Table 6

TABLE 6

| Run No. | Resin | Co, ppm | MXD6, wt-% | SIPA, mol-% | Preform b* | Bottle b* |
|---|---|---|---|---|---|---|
| 12 | C | 100 | 0 | 0 | 0.4 | 0.8 |
| 13 | S1 | 100 | 0 | 0.11 | −1.8 | 1.1 |
| 14 | C | 200 | 3 | 0 | 1.4 | 2.4 |
| 15 | S1 | 200 | 3 | 0.11 | −7.4 | 1.9 |
| 16 | C | 200 | 4 | 0 | 1.0 | 2.8 |
| 17 | S1 | 200 | 4 | 0.11 | −7.8 | 2.0 |
| 18 | C | 200 | 5 | 0 | 3.2 | 3.2 |
| 19 | S1 | 200 | 5 | 0.11 | −6.1 | 2.6 |

At all levels of MXD6 the incorporation of an ionic compatibilizer reduced the yellowness.

The oxygen permeability of the bottle sidewalls was measured and the results plotted in FIG. 1. This shows that the ionic compatibilizer decreases the permeability at each MXD6 concentration. Surprisingly there is a non-linear relationship of oxygen permeability with MXD6 concentration with extremely low values at 5 wt-% MXD6.

Example 4

Figure 2:
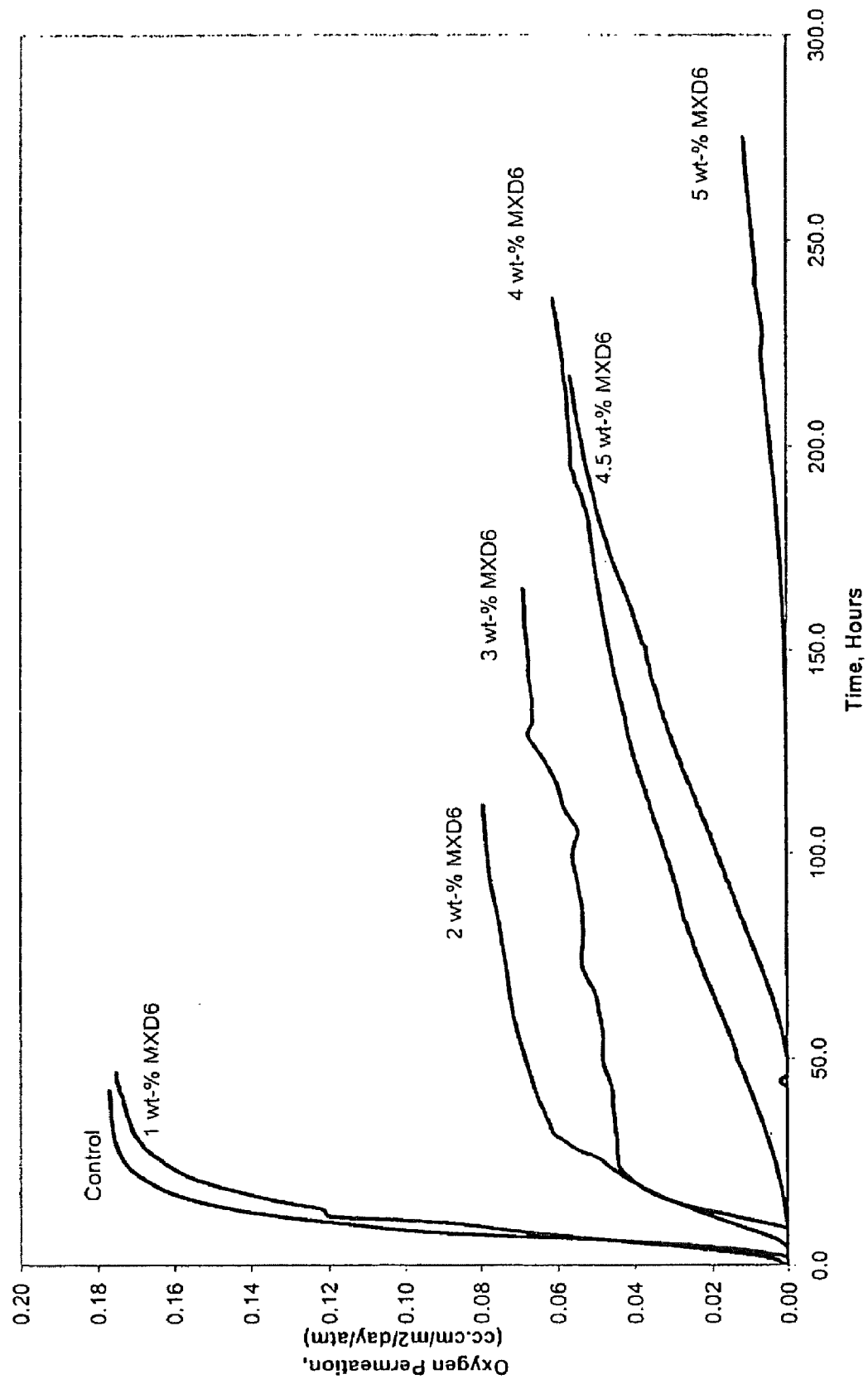
FIG. 2 shows a graph of the oxygen permeation rate of the runs of Example 4.

In order to better define the oxygen permeability as a function of MXD6 concentration a series of blends were prepared using polyester A as the base resin. The concentration of MXD6 used was 1, 2, 3, 4, 4.5 and 5 wt-%, each containing 100 ppm cobalt octoate. The oxygen permeability of the bottle sidewalls was measured and the results shown in FIG. 2.

This illustrates that there is a surprising reduction in oxygen permeability between 4.5 and 5 wt-% MXD6.

Example 5

Another trial was run in which the level of MXD6 was held constant at 5 wt-% and the concentration of SIPA changed, the results are set forth in Table 7. In these runs the base polyester resin was A and the master batch of SIPA polymer S2 was used.

TABLE 7

| Run No. | Resins | Co, ppm | MXD6, wt-% | SIPA, mol-% | Preform b* | Bottle b* |
|---|---|---|---|---|---|---|
| 20 | A | 30 | 0 | 0 | 3.8 | 1.0 |
| 21 | A | 130 | 5 | 0 | 0.5 | 4.1 |
| 22 | A/S2 | 130 | 5 | 0.13 | −2.5 | 3.6 |
| 23 | A/S2 | 130 | 5 | 0.26 | −2.9 | 3.7 |
| 24 | A/S2 | 130 | 5 | 0.65 | −3.6 | 3.3 |
| 25 | S2 | 100 | 5 | 1.3 | −9.1 | 2.8 |

These results show that the ionic compatibilizer can be used as a master batch to obtain the synergistic reduction of yellowness with cobalt, as well as a copolymer that was used in the previous Examples 1-3.

Example 6

Instead of using sodium as the SIPA salt, a copolyester using the divalent zinc ester was made using the process that was used for copolymer S1. Since this Zn copolyester was more yellow than S1 no comparison of the relative difference between Na-SIPA and Zn-SIPA can be given. However the haze of bottle sidewalls made with PET resin A as the control, using 0.11 mol-% SIPA (the runs containing MXD6 contained 100 ppm Co) are compared in Table 8 below.

TABLE 8

| Run No. | MXD6, wt-% | SIPA type | Haze, % |
|---|---|---|---|
| 26 | 0 | none | 5.5 |
| 27 | 5 | none | 14.2 |
| 28 | 5 | Na | 12.0 |
| 29 | 5 | Zn | 9.6 |

It would appear that the divalent ionic compatibilizer is more effective than the monovalent in reducing the bottle sidewall haze.

Example 7

A low molecular weight MXD6 was prepared. A mixture of 438 g of adipic acid, 428.4 g of m-xylylenediamine and 500 g of deionized water were charged in a 2-liter autoclave under nitrogen atmosphere. The mixture was stirred for 15 minutes then heated to reflux for 30 minutes. Water was distilled off and the temperature was increased to 275° C. over a period of 60-90 minutes. The mixture was stirred at 275° C. for 30 minutes before extrusion. This polymer had a viscosity of 9.5 Pa·s at 1000 sec$^{-1}$ and 271° C. (compared to 280 Pa·s for the commercial 6007).

The procedure of Example 3 was followed, using this low molecular weight MXD6 (LMW) compared to the commercial 6007. The results are set forth in Table 9.

TABLE 9

| Run No. | Resin | Co, ppm | MXD6 type | MXD6, wt-% | SIPA, mol-% | Preform b* | Bottle b* |
|---|---|---|---|---|---|---|---|
| 32 | C | 200 | 6007 | 3 | 0 | 2.0 | 2.5 |
| 33 | C | 200 | LMW | 3 | 0 | 3.4 | 2.1 |
| 34 | C | 200 | 6007 | 5 | 0 | 4.2 | 3.5 |
| 35 | C | 200 | LMW | 5 | 0 | 1.1 | 3.6 |
| 36 | S1 | 200 | 6007 | 5 | 0.11 | −6.1 | 2.6 |
| 37 | S1 | 200 | LMW | 5 | 0.11 | −6.6 | 2.0 |

This illustrates that the color is better (less yellow) with the low molecular weight MXD6 than 6007.

The haze of these runs was also measured and the results set forth in Table 10 below.

TABLE 10

| Run No. | Resin | Co, ppm | MXD6 Type | MXD6, wt-% | SIPA, mol-% | Preform Haze, % | Bottle Haze, % |
|---|---|---|---|---|---|---|---|
| 32 | C | 200 | 6007 | 3 | 0 | 50.3 | 10.9 |
| 33 | C | 200 | LMW | 3 | 0 | 48.3 | 7.7 |
| 34 | C | 200 | 6007 | 5 | 0 | 50.1 | 14.0 |
| 35 | C | 200 | LMW | 5 | 0 | 49.9 | 11.8 |
| 36 | S1 | 200 | 6007 | 5 | 0.11 | 49.3 | 11.1 |
| 37 | S1 | 200 | LMW | 5 | 0.11 | 45.4 | 7.4 |

The use of the lower molecular MXD6 in conjunction with SIPA markedly reduces the haze of the bottle sidewalls.

Example 7

In order to determine the effect of the ionic compatibilizer on MXD6 domain size, a series of films were prepared and fractured. PET resin B was used together with blends with the S3 SIPA copolyester and 6007 MXD6. The domain size was measured and the results set forth in Table 11.

TABLE 11

| MXD6, wt-% | SIPA, mol-% | Domain size, μm |
|---|---|---|
| 10 | 0 | 0.8-1.5 |
| 20 | 0 | 2.2-4.5 |
| 20 | 1.35 | 0.2-0.5 |
| 10 | 0.03 | 0.5-1.5 |
| 10 | 0.08 | 0.5-1.5 |
| 10 | 0.16 | 0.2-0.5 |

This shows that at a low level of SIPA, less than 0.2 mol-%, the domain size of a blend containing 10 wt-% MXD6 is reduced to less than 0.5 μm.

Example 8

A series of bottles were produced using C as the base PET resin, the S3 SIPA copolyester and 6007 MXD6. The passive oxygen permeability, at 0% Relative Humidity, of the bottle sidewalls was measured and the results set forth in Table 12.

TABLE 12

| Run No. | MXD6, wt-% | SIPA, mol-% | O$_2$ Permeability (cc(STP)·cm)/ (m$^2$·atm·day) |
|---|---|---|---|
| 38 | 0 | 0 | 0.180 |
| 39 | 2.5 | 0 | 0.181 |
| 40 | 2.5 | 0.3 | 0.164 |
| 41 | 5 | 0 | 0.138 |
| 42 | 5 | 0.3 | 0.131 |
| 43 | 5 | 0.6 | 0.145 |
| 44 | 10 | 0 | 0.079 |
| 45 | 10 | 0.3 | 0.054 |
| 46 | 10 | 0.6 | 0.051 |

This shows that the ionic compatibilizer is improving the oxygen gas barrier at a given MXD6 level, possibly due to the reduction in domain size, which increases the number of domains, as shown in Example 7.

Example 9

Following the procedure of Example 7 a polyamide was produced in which 12% of the adipic acid was replaced with isophthalic acid. The melt viscosity of this polyamide at 171° C. and 1000 sec$^{-1}$ was 237 Pa·s. This polyamide was blended at a 5 wt-% level with PET resin C and ionic compatibilizer S3 to give a level of SIPA of 0.6 mol-% in the blend. Bottles were prepared from this blend and the oxygen permeation rate measures at 0.155 (cc(STP)·cm)/(m$^2$·atm·day). This can be compared with a lower oxygen permeation rate of 0.145 measured on run 43 achieved with 5 wt-% MXD6.

Example 10

The carbon dioxide transmission rate of 0.5 liter bottles made from PET resin A were measured to be 8.6 cc/bottle/day. The addition of 5 wt-% MXD6 decreased this rate to 4.5 cc/bottle/day.

Example 11

Master batches using cobalt stearate and cobalt naphthenate in place of cobalt octoate were prepared using the same method as described above for cobalt octoate. Using PET base resin D, bottles were prepared using different amounts of MXD6 and different concentrations of cobalt octoate, cobalt stearate and cobalt naphthenate. The bottle wall oxygen permeability was measured and the value after 100 hours (at this time the rate is at equilibrium, see FIG. 1) is set forth in Table 13.

TABLE 13

| Run No. | MXD6, wt-% | Cobalt salt | Co, ppm | Oxygen Permeability @ 100 hours, (cc(STP)·cm)/ (m²·atm·day) |
|---|---|---|---|---|
| 47 | 0 | — | — | 0.150 |
| 48 | 1.75 | Octoate | 200 | 0.098 |
| 49 | 1.75 | Octoate | 400 | 0.120 |
| 50 | 1.75 | Stearate | 100 | 0.098 |
| 51 | 1.75 | Stearate | 200 | 0.122 |
| 52 | 3.0 | Octoate | 400 | 0.120 |
| 53 | 3.0 | Octoate | 60 | 0.048 |
| 54 | 5.0 | Octoate | 100 | 0.005 |
| 55 | 5.0 | Stearate | 30 | 0.005 |
| 56 | 5.0 | Stearate | 50 | <0.005 |
| 57 | 5.0 | Naphthenate | 50 | <0.005 |

An excess of the transition metal catalyst can in fact act as an anti-oxidant and increase the oxygen permeability, compare runs 48 and 49, runs 52 and 53.

Although particular embodiments of the invention have been described in detail, it will be understood that the invention is not limited correspondingly in scope, but include all changes and modifications coming within the spirit and terms of the claims appended hereto.

What is claimed is:

1. A composition for containers comprising:
   a copolyester comprising a metal sulfonate salt;
   a partially aromatic polyamide;
   and a cobalt salt.

2. The composition of claim 1, wherein said partially aromatic polyamide is present in a range from about 1 to about 10 wt. % of said composition.

3. The composition of claim 2, wherein said metal sulfonate salt is present in a range from about 0.1 to about 2.0 mole % of said composition.

4. The composition of claim 1, wherein said cobalt salt is present in a range from about 20 to about 500 ppm of said composition.

5. The composition of claim 1, wherein said partially aromatic polyamide is meta-xylylene adipamide.

6. The composition of claim 1, wherein said partially aromatic polyamide is selected from the group consisting of poly(hexamethylene isophthalamide), poly(hexamethylene adipamide-co-isophthalamide), poly(hexamethylene adipamide-co-terephthalamide), poly(hexamethylene isophthalamide-co-terephthalamide), and mixtures of two or more of these.

7. The composition of claim 1, wherein said cobalt salt is selected from the group consisting of cobalt acetate, cobalt carbonate, cobalt chloride, cobalt hydroxide, cobalt naphthenate, cobalt oleate, cobalt linoleate, cobalt octoate, cobalt stearate, cobalt nitrate, cobalt phosphate, cobalt sulfate, cobalt (ethylene glycolate), and mixtures of two or more of these.

8. The composition of claim 1, wherein the metal ion of the metal sulfonate salt is selected from the group consisting of Na+, Li+, K+, Zn++, Mn++, and Ca++.

9. The composition of claim 8, wherein said metal sulfonate salt is attached to an aromatic acid nucleus selected from the group consisting of sulfophthalic acid, sulfoterephthalic acid, sulfoisophthalic acid, 4-sulfonaphthalene-2,7-dicarboxylic acid, and esters of each.

10. The composition of claim 1, wherein said metal sulfonate salt is 5-sodiumsulfoisophthalic acid, 5-zincsulfoisophthalic acid, or dialkyl esters thereof.

11. The composition of claim 10, wherein the dialkyl ester is a dimethyl ester (SIM) or a glycol ester (SIPEG).

12. An article comprising the composition of any one of claims 1-11; wherein said article is a preform or a container.

13. The article of claim 12, wherein the article is a container having an oxygen permeation rate of <0.01 cc(STP)-cm/m²-atm-day after 100 hours in oxygen.

14. The container of claim 13, having a yellowness value (b*) of less than 2.5.

15. The article of claim 12, wherein the article is a container that has a carbon dioxide transmission rate of less than 7 cc/bottle/day, based on a 0.59 liter bottle.

* * * * *